July 14, 1925. 1,546,017
H. T. HERR
ARTICULATED RAILWAY VEHICLE
Filed Nov. 5, 1923
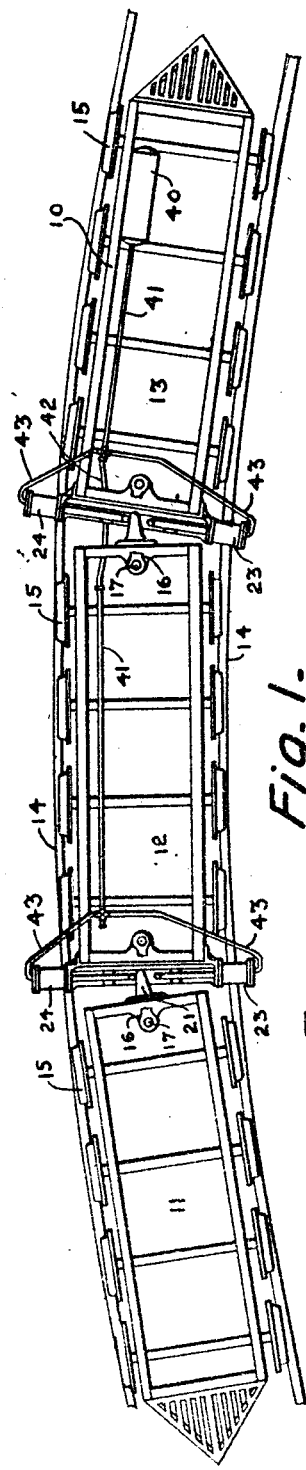
H. T. Herr
INVENTOR
BY D.C. Davis
ATTORNEY Patented July 14, 1925.

1,546,017

UNITED STATES PATENT OFFICE.

HERBERT T. HERR, OF PHILADELPHIA, PENNSYLVANIA, ASSIGNOR TO WESTINGHOUSE ELECTRIC AND MANUFACTURING COMPANY, A CORPORATION OF PENNSYLVANIA.

ARTICULATED RAILWAY VEHICLE.

Application filed November 5, 1923. Serial No. 673,014.

*To all whom it may concern:*

Be it known that I, HERBERT T. HERR, a citizen of the United States, and a resident of Philadelphia, in the county of Philadelphia and State of Pennsylvania, have invented a new and useful Improvement in Articulated Railway Vehicles, of which the following is a specification.

This invention relates to railway vehicle trucks and particularly to means for connecting trucks of the type employed in articulated locomotives, and it has for an object to provide apparatus of the character designated which shall be so constructed as to oppose the relative lateral movements of the adjacent ends of the connected trucks, which relative lateral movement may be occasioned by traversing curved sections of track, with a force sufficient to prevent such lateral movement for a predetermined track curvature and to permit, but to resist to some extent, lateral movement for a greater track curvature.

These and other objects of my invention, which will be manifest in the further description thereof, are set forth in the following specification and illustrated in the accompanying drawing in which Fig. 1 is an outline plan view of a locomotive embodying three articulated trucks traversing a curved section of track and equipped with articulation apparatus of the character employed in my invention; Fig. 2 is an enlarged plan view of the adjacent ends of two of the trucks shown with the draw bar broken away and Fig. 3 is a sectional elevation taken on the line III—III of Fig. 2.

Railway locomotives employing multi-wheel trucks, as for example, those having three trucks of eight driving wheels each coupled with longitudinally-disposed links pivotally connected thereto and permitting freedom of articulation, when traversing curved sections of track, develop a side thrust between the wheel flanges and the rails, resulting in wear thereof. Under extreme conditions of operation, this side thrust results at times in the derailment of the vehicle or a prying loose of a section of the rail.

The rear wheel in the front truck has been found by trial to run against the inner rail of the curve (unless the speed is excessive when centrifugal force throws it against the outer rail), while the front wheel of the rear truck runs against the outer rail. If freedom of lateral movement between the adjacent ends of coupled trucks is restricted, however, the rear wheel of the front truck will usually be drawn away from the rail and the pressure on the flange of the front wheel of the rear truck consequently reduced.

Freedom of lateral movement has, in some instances, been restrained by the installation of rigid or flexible transverse links pivotally connected to diagonally-disposed adjacent corners of the trucks. Connecting means of this type, however, considerably complicate the operation of coupling or uncoupling the respective trucks composing the locomotive. Furthermore, I have found that any restraining means which may be interposed between adjacent truck ends should prevent lateral movement when tranversing curved portions of track up to a certain degree of curvature, and permit, but restrain to some extent, lateral movement when traversing track of greater curvature, and that the amount of restraint imposed upon the laterally-moving trucks should be uniform throughout the entire movement.

I therefore provide a projecting member or tongue which is rigidly secured to one of the trucks and which is interposed between two cross-head members having rolling contact therewith. The two cross-head members are held in engagement with the tongue by separate pistons disposed in suitable cylinders which are secured to the adjacent trucks. The cylinders are in communication with the compressed air reservoir of the locomotive, and the pressure of the air upon the pistons causes the tongue to be firmly held between the cross-heads. Should the side thrust of the trucks be sufficient to overcome the air pressure, lateral movement is permitted. The cylinders being in communication with the large reservoir, however, the air present in the cylinders is not further compressed by the movement of the piston, and consequently, the restraining influence exerted upon the laterally moving trucks is uniform. Furthermore, the trucks may be readily coupled or uncoupled without requiring the slightest attention being paid to the articulating device. By equipping locomotives of the electrically driven type with my apparatus, I have found that the side thrust created by the wheel flanges upon the rails has been so reduced as to substantially double the mileage procured from the driving wheel tires.

Referring to the drawings for a more detailed description of my invention, I show in Fig. 1 a locomotive 10 embodying three trucks 11, 12 and 13 and traversing a curved section of track 14. Each truck is provided with eight driving wheels 15—15, and said trucks are coupled in the usual manner by means of longitudinally-extending draw bars 16 which are pivotally connected to the respective trucks as at 17. As shown to a larger scale in Figs. 2 and 3, a projecting member or tongue 21 is rigidly secured by bolts 22 to one end of both of the trucks 11 and 12. Secured to one end of the adjacent trucks 12 and 13 are the transversely-disposed cylinders 23 and 24. Arranged within the cylinders are pistons 25 to which are secured by means of rods 26 and 27 cross-heads 28 and 29. The cross-heads 28 and 29 are provided with vertically-disposed pins 30 and 31 upon which rollers 32 and 33 bear and engage the opposite sides of the tongue 21. The cross-heads 28 and 29 reciprocate in a common guide 34 which is supported by means of a bracket 35 upon one end of the trucks 12 and 13.

Arranged in any suitable location upon the locomotive is a compressed air reservoir 40 of any type which may be a part of the braking system. Connected to this reservoir is a main conduit 41 having a flexible portion 42 provided between the trucks 12 and 13. Connected to the main conduit 41 are branch conduits 43 which communicate with the outer ends of the cylinders 23 and 24. Fixed in the inner end of the cylinders 23 and 24 is an annular L-shaped packing member 44 for preventing leakage of the compressed air between the diameter of the piston 25 and the bore of the cylinder 24.

Having thus described the arrangement of an apparatus embodying one form of my invention, the operation thereof is as follows: The pressure of the air which is present in the reservoir 40 is conveyed by means of the main conduit 41, the flexible conduit 42 and the branch conduits 43—43 to the cylinders 23 and 24 wherein it acts upon the outer faces of the pistons 25 and maintains them in the position illustrated in Fig. 2 (assuming a straight track). In this position, the piston 25 compresses to some extent the resilient packing member 44, forming an air-tight closure.

When traversing straight sections of track, the pistons are maintained in the afore-mentioned position, and the tongue 21 remains centrally disposed between the rollers 32 and 33. Upon the locomotive traversing a section of track having a small or normal degree of curvature, the adjacent ends of the trucks tend to move laterally with respect to each other, whereupon the tongue 21 exerts a resultant force upon either the roller 32 or 33, depending upon the direction of curvature. This force is transmitted through the proper cross-head 28 or 29 and rod 26 or 27 to one of the pistons 25 and is resisted by the pressure of the air acting thereon. Relative lateral movement of the trucks is therefore prevented and a deciding guiding action is exerted, which considerably reduces the side thrust of the wheels upon the rail.

Upon the locomotive traversing a section of track having a considerable or abnormal degree of curvature, some freedom of lateral movement between the trucks must be allowed in order to avoid the destruction or distortion of the truck or the track. My apparatus is so designed that under a condition such as this, the opposing forces exerted by the trucks are sufficient to overcome the pressure of the air acting upon the opposing piston 25, and the latter is moved toward the outer end of the cylinder. The resistance offered by the piston to this outward movement is, however, sufficient to exert a similar guiding action upon the trucks as is present when traversing portions of track having a lesser degree of curvature. Because of the large storage volume contained in the reservoir 40 and the free communicating means provided between the reservoir and the cylinders 23 and 24, the air displaced by the piston 25 in its outward movement is creative of substantially no increase in pressure and therefore the resistance offered by the piston to the relative lateral movement of the trucks is uniform throughout its entire extent, a feature I have found from actual practice to be very desirable.

As may be ascertained from Fig. 1, the arrangement of my locomotive is such that the center truck 12 may be removed and the two end trucks 11 and 13 coupled directly together without requiring any labor other than that ordinarily involved in the coupling and uncoupling of locomotive trucks which are not equipped with any articulating device.

While I have shown my invention in but one form, it will be obvious to those skilled in the art that it is not so limited but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a railway vehicle, the combination with a pair of trucks, of fluid-pressure means for exerting a force which shall oppose forces created by the relative lateral movement of the trucks.

2. In a railway vehicle, the combination with a plurality of trucks, of fluid-pressure means for exerting forces which shall oppose forces created by the relative lateral movement of adjacent ends of the trucks.

3. In a railway vehicle, the combination with a pair of trucks, of fluid-pressure means for restraining relative lateral movement of the trucks, said fluid-pressure means being unyieldable under a predetermined load but adapted to yield under a greater load.

4. In a railway vehicle, the combination with a plurality of trucks, of fluid-pressure means for restricting relative lateral movements of adjacent ends of the trucks, said fluid-pressure means being unyieldable under a predetermined load but adapted to yield under a greater load.

5. In a railway vehicle, the combination with a pair of trucks, of fluid-pressure means for substantially preventing relative lateral movement of the trucks under normal conditions of operation of the vehicle and for permitting relative lateral movement of the trucks under abnormal conditions of operation.

6. In a railway vehicle, the combination with a pair of trucks, of fluid-pressure means interposed between adjacent ends of said trucks for restraining relative lateral movement thereof, said fluid-pressure means being adapted to substantially prevent any relative lateral movement of the trucks during normal conditions of operation of the vehicle but to permit relative movement under abnormal conditions of operation.

7. In a railway vehicle, the combination with a pair of trucks, of means for preventing relative lateral movement of adjacent ends of the trucks when traversing sections of track of a certain degree of curvature and for permitting and restraining relative lateral movement when traversing curved portions of track having a greater degree of curvature, the amount of restraint imposed being uniform throughout the extent of such lateral movement.

8. In a railway vehicle, the combination with a pair of trucks, of restraining elements associated with one of the trucks and adapted to act transversely upon either side of the second truck, whereby relative lateral movements of the second truck with respect to the first truck are restrained.

9. In a railway vehicle, the combination of a pair of trucks, transversely-disposed pistons having projecting means associated with one of the trucks and adapted to act oppositely upon a portion of the second truck, and means for exerting a predetermined force upon the pistons, whereby relative lateral movement of the trucks is prevented under normal conditions of operation and permitted under abnormal conditions of operation.

10. In a railway vehicle, the combination of a pair of trucks, a projecting member rigidly secured to one of the trucks, and restraining apparatus associated with the second truck for opposing relative lateral movements of said projecting member in either direction.

11. In a railway vehicle, the combination of a pair of trucks, a rigid member projecting from one of the trucks, and means secured to the second truck for exerting a constant force upon either side of said rigid member upon a relative lateral movement of the trucks.

12. In a railway vehicle, the combination of a pair of trucks, a rigid member projecting from one of the trucks, restraining pistons associated with the second truck and having projecting means adapted to engage the rigid member upon either side, and means for exerting a constant force upon each piston in the direction of said rigid member.

13. In a railway vehicle, the combination of a pair of trucks, a rigid member projecting from one of the trucks, restraining pistons associated with the second truck and having projecting means adapted to engage the rigid member upon either side, and means for maintaining a constant pressure of fluid upon one face of each of said pistons.

14. In a railway vehicle, the combination of a pair of trucks, a projecting member rigidly secured to one of the trucks, a cylinder disposed transversely on each side of the projecting member and secured to the adjacent end of the second truck, a piston disposed within each cylinder, means for maintaining a pressure of fluid upon the outer faces of the pistons, and cross-heads secured to the respective pistons, said cross-heads being adapted to engage the projecting member.

15. In a railway vehicle, the combination of a pair of trucks, a longitudinally-extending projecting member rigidly secured to one of the trucks, a cylinder disposed transversely on each side of the projecting member, said cylinders being rigidly secured to the adjacent end of the second truck, a piston disposed in each cylinder, means for maintaining a constant pressure of fluid upon the outer faces of the pistons, a cross-head secured to each piston, said cross-head being adapted to engage the projecting member, and a guide for the cross-head.

16. In a railway vehicle, the combination of a pair of trucks, a centrally-disposed projecting member rigidly secured to one of the trucks, a cylinder disposed transversely on each side of the projecting member and secured to the adjacent end of the second truck, a piston disposed within each cylinder, a cross-head secured to each piston, means for supplying fluid under pressure to the cylinders, and a guide for the cross-head secured to one of the trucks.

17. In a railway vehicle, the combination of a pair of trucks, a longitudinally-extending projecting member secured to one of the trucks, a transversely-disposed cylinder arranged on each side of the projecting member, a piston disposed within each cylinder, a cross-head including a roller bearing secured to each piston, and means for supplying fluid under pressure to the pistons.

18. In a railway vehicle, the combination with a pair of trucks, of a projecting member rigidly secured to one of the trucks, a cylinder secured to the second truck, a piston disposed within the cylinder, a cross-head secured to the piston and adapted to engage the projecting member, means for maintaining a fluid under pressure upon the face of the piston oppositely disposed from the cross-head, and a compressible fluid-pressure sealing element disposed within the cylinder and adapted to receive the piston, whereby leakage of fluid is minimized.

19. In a railway vehicle, the combination of a plurality of articulated trucks, fluid-pressure means provided between the adjacent ends of the trucks for resisting relative lateral movement, a reservoir for the storage of fluid under pressure provided in the vehicle, and communicating means between the reservoir and the said fluid-pressure means.

20. In a railway vehicle, the combination of a plurality of articulated trucks, a longitudinally-extending rigid member projecting from one adjoining end of each truck, restraining pistons supported on the second adjoining end of each truck and cooperating with said projecting member, a reservoir for the storage of fluid under pressure provided in the vehicle, and means for maintaining said fluid under pressure upon the pistons for restraining relative lateral movement of the trucks.

21. In a railway vehicle, the combination of a pair of articulated trucks, a pair of cylinders associated with one of said trucks, a reservoir for the storage of fluid under pressure provided in the vehicle, a communicating means provided between the reservoir and the cylinders, and a piston disposed within each cylinder, each of the said pistons being adapted to exert lateral forces for opposing relative transverse movement of the trucks.

22. The combination with an articulated vehicle, of a centering device comprising a pair of fluid-pressure-actuated members disposed between the articulated parts to yieldingly restrain movement thereof.

23. The combination with an articulated vehicle, of a centering device comprising a pair of fluid-pressure-actuated members disposed between the articulated parts to yieldingly restrain relative transverse movement thereof.

24. The combination with an articulated vehicle, of a centering device comprising a fluid-pressure device adapted to engage the articulated parts to yieldingly restrain the same against relative transverse movement.

25. The combination with an articulated railway vehicle, of a centering device therefor and means for effecting steering of the articulated members relative to the curvature of the rail, said centering device comprising a fluid-pressure apparatus mounted on one of the articulated members and adapted to co-operatively engage projecting portions of the other articulated member to yieldingly restrain relative movement thereof.

In testimony whereof, I have hereunto subscribed my name this 29th day of October 1923.

HERBERT T. HERR.